US012654793B2

(12) United States Patent (10) Patent No.: US 12,654,793 B2
Johnson et al. (45) Date of Patent: Jun. 16, 2026

(54) CONVERTIBLE OFF-ROAD TRAILER

(71) Applicant: Polaris Industries Inc., Medina, MN (US)

(72) Inventors: Barry Alan Johnson, Roseau, MN (US); Derek Thibert, Roseau, MN (US); Cory Wimpfheimer, Greenbush, MN (US); Jeffrey A. Eaton, Roseau, MN (US); Matthew Prusak, Salol, MN (US); Rachel L. Kendall, Roseau, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 279 days.

(21) Appl. No.: 18/476,623

(22) Filed: Sep. 28, 2023

(65) Prior Publication Data

US 2024/0109614 A1 Apr. 4, 2024

Related U.S. Application Data

(60) Provisional application No. 63/411,739, filed on Sep. 30, 2022.

(51) Int. Cl.
|  |  |
|---|---|
| *B62D 63/06* | (2006.01) |
| *B60G 7/00* | (2006.01) |
| *B62M 29/00* | (2006.01) |

(52) U.S. Cl.
CPC ........... B62D 63/061 (2013.01); B60G 7/003 (2013.01); B62M 29/00 (2013.01)

(58) Field of Classification Search
CPC ...... B62D 63/061; B60G 7/003; B62M 29/00; B62K 27/003
See application file for complete search history.

(56) References Cited

U.S. PATENT DOCUMENTS

| | | | |
|---|---|---|---|
| 3,653,677 A | 4/1972 | Feser | |
| 3,730,542 A | 5/1973 | Chadwick | |
| 3,779,572 A | 12/1973 | Cheney | |
| 4,291,891 A | 9/1981 | Blanchette | |
| 5,092,623 A * | 3/1992 | Swanner | B62D 63/061 |
| | | | 280/789 |

(Continued)

OTHER PUBLICATIONS

ShoreLand'r Advantages, https://www.shorelandr.com/boat-trailers/advantage, Sep. 28, 2023, 6 pages.

*Primary Examiner* — Erez Gurari
(74) *Attorney, Agent, or Firm* — Merchant & Gould, P.C.

(57) ABSTRACT

A trailer for use with off-road vehicles such as all-terrain vehicles and snowmobiles. The disclosed off-road trailer can be adjusted to accommodate different trailer beds and attachments that can be readily off loaded and can be compactly packaged for shipping and storage. Modules for different conditions (e.g., ground or snow surface) can be implemented for multi-season usage. The disclosed suspension assembly enhances performance and robustness while maintaining cost effectiveness. The utility of the disclosed off-road trailer may be enhanced by grab handles for manual maneuvering, a rear bumper, and an active tail light. The overall design of the off-road trailer enables towing cargo behind a snowmobile or off-road vehicle over rough terrain at higher rates of speed than conventional off-road towable trailers.

12 Claims, 11 Drawing Sheets

(56)                References Cited

U.S. PATENT DOCUMENTS

| | | | |
|---|---|---|---|
| 5,242,176 A | 9/1993 | Hendrickson | |
| 5,308,096 A | 5/1994 | Smith | |
| 5,513,868 A | 5/1996 | Barr | |
| 6,113,116 A * | 9/2000 | Stanton | B62B 13/06 |
| | | | 280/26 |
| 6,254,117 B1 * | 7/2001 | Cross | B62D 63/062 |
| | | | 280/491.1 |
| 6,692,014 B1 * | 2/2004 | Grosso | B60G 7/02 |
| | | | 280/491.1 |
| 6,698,782 B2 | 3/2004 | Bouchard | |
| 8,863,867 B1 * | 10/2014 | Haworth | B62D 63/062 |
| | | | 280/30 |
| 9,315,081 B1 * | 4/2016 | Beutler | B60D 1/06 |
| 10,384,504 B2 | 8/2019 | Nozzarella | |
| 11,117,604 B2 * | 9/2021 | Kramer | B63B 32/80 |
| 11,453,448 B1 * | 9/2022 | Andrews | B60D 1/52 |

| | | | |
|---|---|---|---|
| 2003/0038451 A1 * | 2/2003 | Bouchard | B62D 61/125 |
| | | | 280/415.1 |
| 2003/0218316 A1 * | 11/2003 | Simpson | B62D 63/061 |
| | | | 280/656 |
| 2004/0135349 A1 * | 7/2004 | Palmer | B60D 1/145 |
| | | | 280/656 |
| 2006/0284397 A1 * | 12/2006 | Lambert | B62D 21/20 |
| | | | 280/491.1 |
| 2007/0132209 A1 * | 6/2007 | Winter | B62D 63/062 |
| | | | 280/656 |
| 2007/0170701 A1 * | 7/2007 | Dugal | B62D 63/061 |
| | | | 280/656 |
| 2007/0176383 A1 * | 8/2007 | Winter | B60G 11/113 |
| | | | 280/124.17 |
| 2018/0265147 A1 * | 9/2018 | Budahazi | B25H 1/12 |
| 2021/0197704 A1 * | 7/2021 | Kliegle | B62B 19/04 |
| 2022/0016946 A1 * | 1/2022 | Pack | B60D 1/247 |
| 2024/0109614 A1 * | 4/2024 | Johnson | B62D 21/20 |

* cited by examiner

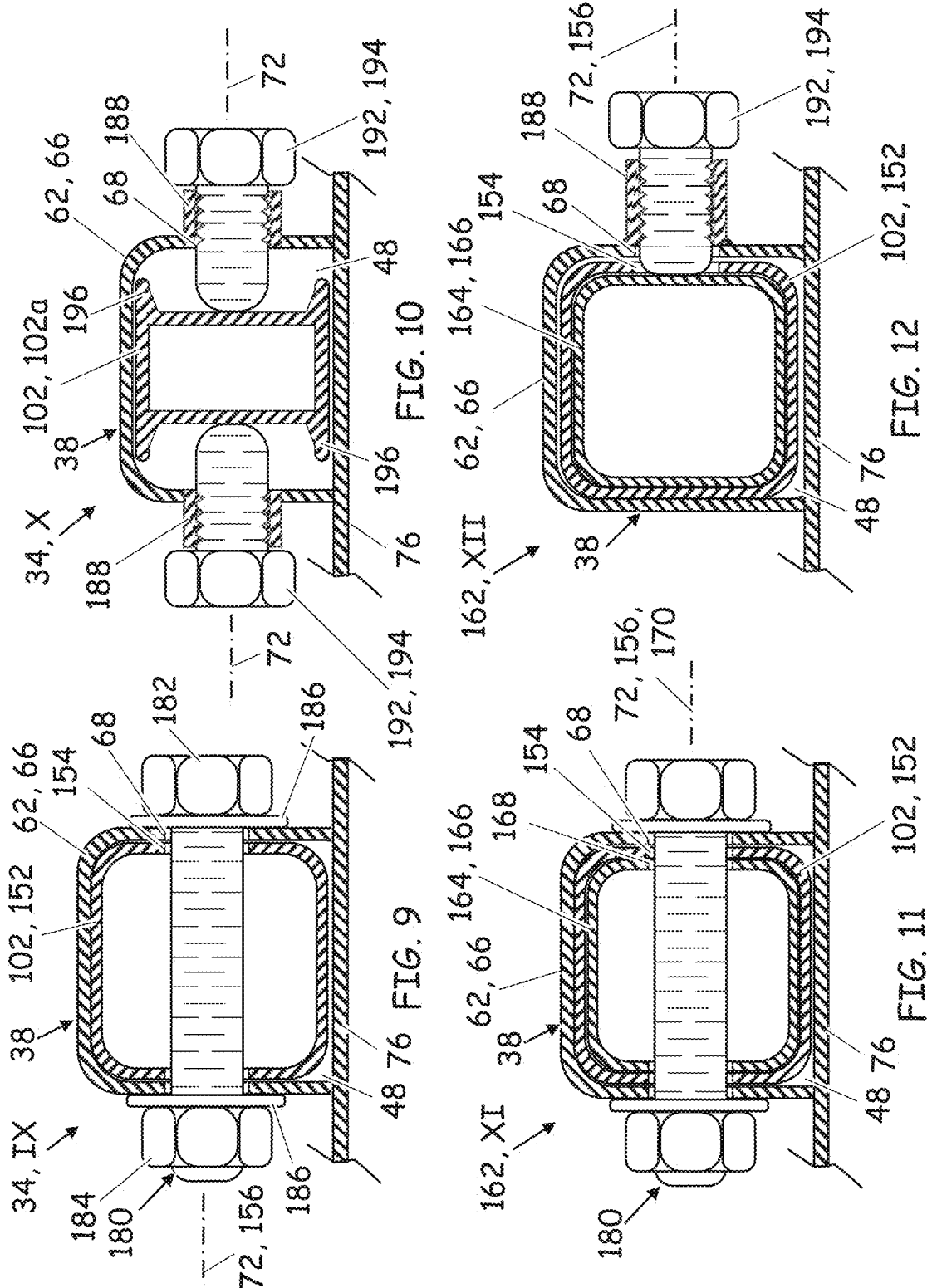

378   DT' = Dmin'   374   376

40', 40a'   380   382

Hmax'   40', 40a'   372

372   248'   312' 212'   108'   Hmax' = DT'

DT' = Dmin'          374

Hmax'          40', 40a'          372

Hmax' = DT'

CONVERTIBLE OFF-ROAD TRAILER

CROSS REFERENCE TO RELATED APPLICATIONS

This application claims the benefit of U.S. Provisional Application No. 63/411,739, filed Sep. 30, 2022, the entire contents of which are incorporated by reference herein.

BACKGROUND

Trailers for use with off-road vehicles, such as all-terrain vehicles and snowmobiles, tend to be designed for specific load types and configurations, terrain, and even specific seasons. For example, an off-road trailer for use with an ATV may be equipped with wheels, while an off-road trailer for use with a snowmobile may be equipped with skis. Trailer length, including tongue length, may vary from trailer to trailer, depending on an intended payload. Variation in payload characteristics, such as weight, size, center of gravity, and so on will affect the tongue weight of the loaded trailer, which will affect operation of the off-road vehicle and connected trailer, depending on vehicle characteristics. Consequently, if an owner of different types of off-road vehicles wishes to tow year-round, and/or tow varying types of loads, that owner typically needs to purchase multiple trailers, such as one with skis, one with wheels, a large trailer, a small trailer, and so on. Purchasing multiple trailers not only increases up-front ownership costs as well as ongoing maintenance costs, but may also require increased storage space.

SUMMARY OF THE DISCLOSURE

Various embodiments of the disclosure are directed to a trailer for use with off-road vehicles such as all-terrain vehicles and snowmobiles with improved functionality and cost-effective construction. The disclosed off-road trailer includes adjustability to accommodate different trailer beds and attachments that can be readily off loaded and is amenable to compact packaging for shipping and storage. Some embodiments accommodate different terrain modules for multi-season usage. The disclosed suspension assembly enhances performance and robustness while maintaining cost effectiveness. The utility of the disclosed off-road trailer may be enhanced by grab handles for manual maneuvering, a rear bumper, and an active tail light. The overall design of the off-road trailer enables towing cargo behind a snowmobile or ORV over rough terrain at higher rates of speed than conventional off-road towable trailers.

Structurally, various embodiments of the disclosure disclose an off-road towable trailer comprising a suspension assembly including a chassis that defines a central through-passage about a central axis that extends in an axial direction, the chassis being laterally centered about the central axis, and a ground engagement component that supports the chassis. A center beam assembly may be configured to be received by the central through-passage and having a first end and a second end, with a tongue coupled to the first end of the center beam assembly. The suspension assembly may be configured to be selectively position and affix to the center beam assembly at a plurality of locations along the center beam assembly.

In some embodiments, the center beam assembly includes a main beam portion, wherein a wall of the main beam portion defines a first plurality of mounting holes, each of the first plurality of mounting holes defining and being concentric about a respective mounting axis. The first plurality of mounting holes may be through-holes that extend through the main beam portion. In some embodiments, the respective mounting axis extends in the lateral direction. The first plurality of mounting holes may be linearly and uniformly spaced along the main beam portion.

In some embodiments, the center beam assembly includes a telescoping beam portion disposed within the main beam portion in a telescoping arrangement. A wall of the telescoping beam portion may define a second plurality of mounting holes, each of the second plurality of mounting holes defining and being concentric about a respective mounting axis. The respective mounting axis of each of the second plurality of mounting holes may extend in the lateral direction. In some embodiments, the second plurality of mounting holes are linearly and uniformly spaced along the telescoping beam portion. The first plurality and the second plurality of mounting holes may be through-holes that extend through the main beam portion and the telescoping beam portion, respectively. In some embodiments, at least some of the first plurality of mounting holes and at least some of the second plurality of mounting holes are configured for selective alignment with each other.

In some embodiments, the central through-passage of the chassis is at least partially defined by a structural member that is one of a channel and a polygonal tube of the chassis. A wall of the structural member may define a plurality of mounting holes configured for alignment with a selected plurality of mounting holes defined by the center beam assembly, and each of the plurality of mounting holes of the structural member may define and be concentric about a respective mounting axis. Each of the plurality of mounting holes of the structural member may extend in the lateral direction.

In some embodiments, the suspension assembly includes a torsion axle assembly coupled to the chassis, the torsion axle assembly including a torsion axle that extends in a lateral direction. The torsion axle may define a polygonal cross-section, for example a square. In some embodiments, comprising a torsion arm is configured for selective coupling to the torsion axle. The torsion arm may include a mechanical coupler for the selective coupling to the torsion axle, which may include a clamping structure. In some embodiments, the torsion axle assembly provides suspension of the chassis without an additional shock absorber or spring. The torsion axle assembly may include a housing with a mounting flange for mounting to the chassis. Some embodiments of the disclosure comprise one of a wheel assembly and a ski assembly coupled to a second end of the torsion arm of the torsion axle assembly.

Various embodiments of the disclosure include a method of shipping an off-road towable trailer, comprising: determining a maximum allowable height of packaged components to be crated based on an overall dimension of a component having a greatest minimum overall dimension; configuring each of the packaged components to have a height that is less than or equal to the maximum allowable height; and arranging the packaged components in a crate for shipping. The maximum allowable height may be the greatest minimum overall dimension. In some embodiments, the component having the greatest minimum overall dimension is a ground engagement component. The ground engagement component may be a tire and the maximum allowable height based on a lateral width of the tire. In some embodiments, the ground engagement component is a ski assembly, and the maximum allowable height is based on a tangential dimension of the ski assembly or alternatively a lateral width of the ski assembly.

Various embodiments of the disclosure present an off-road towable trailer comprising a chassis that defines a central through-passage about a central axis that extends in an axial direction, the chassis being laterally centered about the central axis and a center beam assembly configured to be received by the central through-passage, the center beam assembly including a first upright assembly and a second upright assembly, and means for selecting an axial distance between the first upright support assembly and the second upright support assembly.

Various embodiments of the disclosure disclose an off-road towable trailer, comprising a chassis that defines a central through-passage about a central axis that extends in an axial direction, the chassis being laterally centered about the central axis, a center beam assembly configured to be received by the central through-passage, the center beam assembly including a first upright assembly and a second upright assembly; and means for selecting an axial location of the chassis along the center beam assembly.

Various embodiments of the disclosure disclose an off-road towable trailer, comprising: a chassis that defines a central through-passage about a central axis that extends in an axial direction, the chassis being laterally centered about the central axis; a center beam assembly configured to be received by the central through-passage, the center beam assembly including a first upright assembly and a second upright assembly, wherein the chassis, the first upright assembly, and the second upright assembly are arranged for supporting a trailer bed; and means for accommodating different trailer bed lengths.'

Various embodiments of the disclosure disclose an off-road towable trailer, comprising: a chassis that defines a central through-passage about a central axis that extends in an axial direction, the chassis being laterally centered about the central axis; a center beam assembly configured to be received by the central through-passage; and means for securing the chassis to the center beam assembly.

Various embodiments of the disclosure include a method for adjusting an off-road trailer to receive trailer beds of different lengths, comprising: providing an off-road trailer including a chassis that defines a central through-passage about a central axis that extends in an axial direction, the chassis being laterally centered about the central axis, and a center beam assembly configured to be received by the central through-passage, the center beam assembly including a first upright assembly and a second upright assembly, wherein the chassis, the first upright assembly, and the second upright assembly are arranged for supporting a trailer bed; and providing instructions on a tangible, non-transitory medium, the instructions including steps for securing the chassis to the center beam assembly. In some embodiments, the center beam assembly provided in the step of providing the off-road trailer includes a first upright assembly and a second upright assembly, and the instructions include steps for adjusting the off-road trailer to receive trailer beds of different lengths.

BRIEF DESCRIPTION OF THE DRAWINGS

FIG. 9 is a sectional schematic at plane IX of the subassembly of FIG. 6 according to an embodiment of the disclosure;

FIG. 10 is a sectional schematic of an alternative arrangement for the sub assembly of FIG. 5 according to an embodiment of the disclosure;

FIG. 11 is a sectional schematic at plane XI of the subassembly of FIG. 8 according to an embodiment of the disclosure;

FIG. 12 is a sectional schematic of an alternative arrangement for the sub assembly of FIG. 7 according to an embodiment of the disclosure;

FIG. 18 is a perspective view of the packaging configuration of FIG. 17 according to an embodiment of the disclosure;

FIG. 19 is a side elevational view of a ski assembly of FIG. 21 in an alternative packaging orientation according to an embodiment of the disclosure;

FIG. 21 is a perspective view of the alternative packaging configuration of FIG. 20 according to an embodiment of the disclosure;

DETAILED DESCRIPTION OF THE FIGURES

Figures 1, 2:
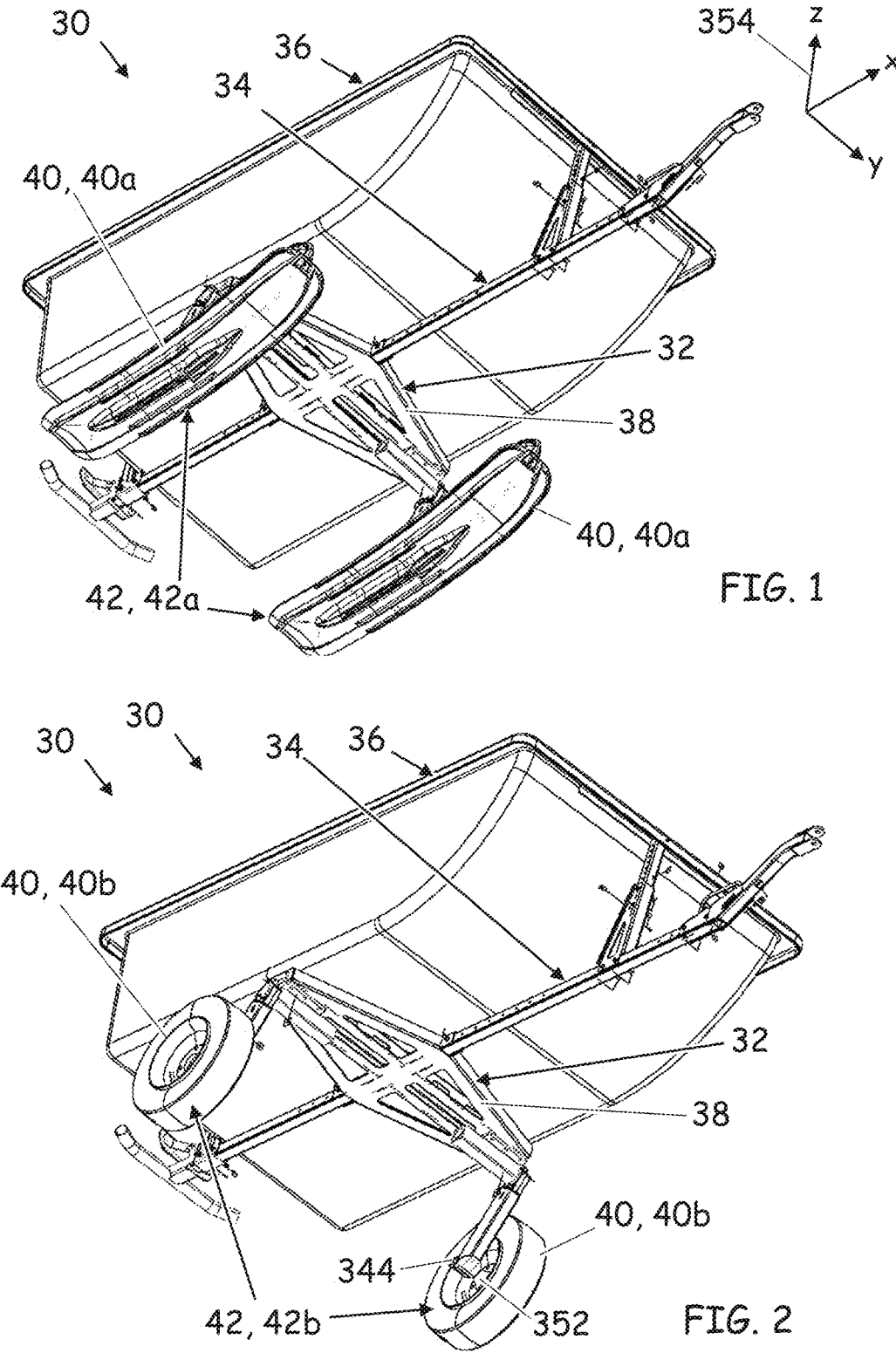
FIG. 1 is a lower perspective view of an off-road trailer with ski assembly ground engagement modules according to an embodiment of the disclosure.
FIG. 2 is a lower perspective view of the off-road trailer of FIG. 1 with wheel assembly ground engagement modules according to an embodiment of the disclosure.

Referring to FIGS. 1 and 2, an off-road trailer 30 is depicted according to embodiments of the disclosure. The off-road trailer 30 includes a suspension assembly 32 and a center beam assembly 34 that cooperate to support and secure a trailer bed 36. The suspension assembly 32 includes a chassis 38 to which various ground engagement modules 42 can be attached. The ground engagement modules 42 include ground engagement components 40 that contact the terrain. Example ground engagement modules include a snow ski module 42a with a ski assembly 40a as the ground engagement component 40 (FIG. 1) or a wheel or tire assembly module 42b with a wheel or tire 40b as the ground engagement component 40 (FIG. 2).

Figures 3, 4:
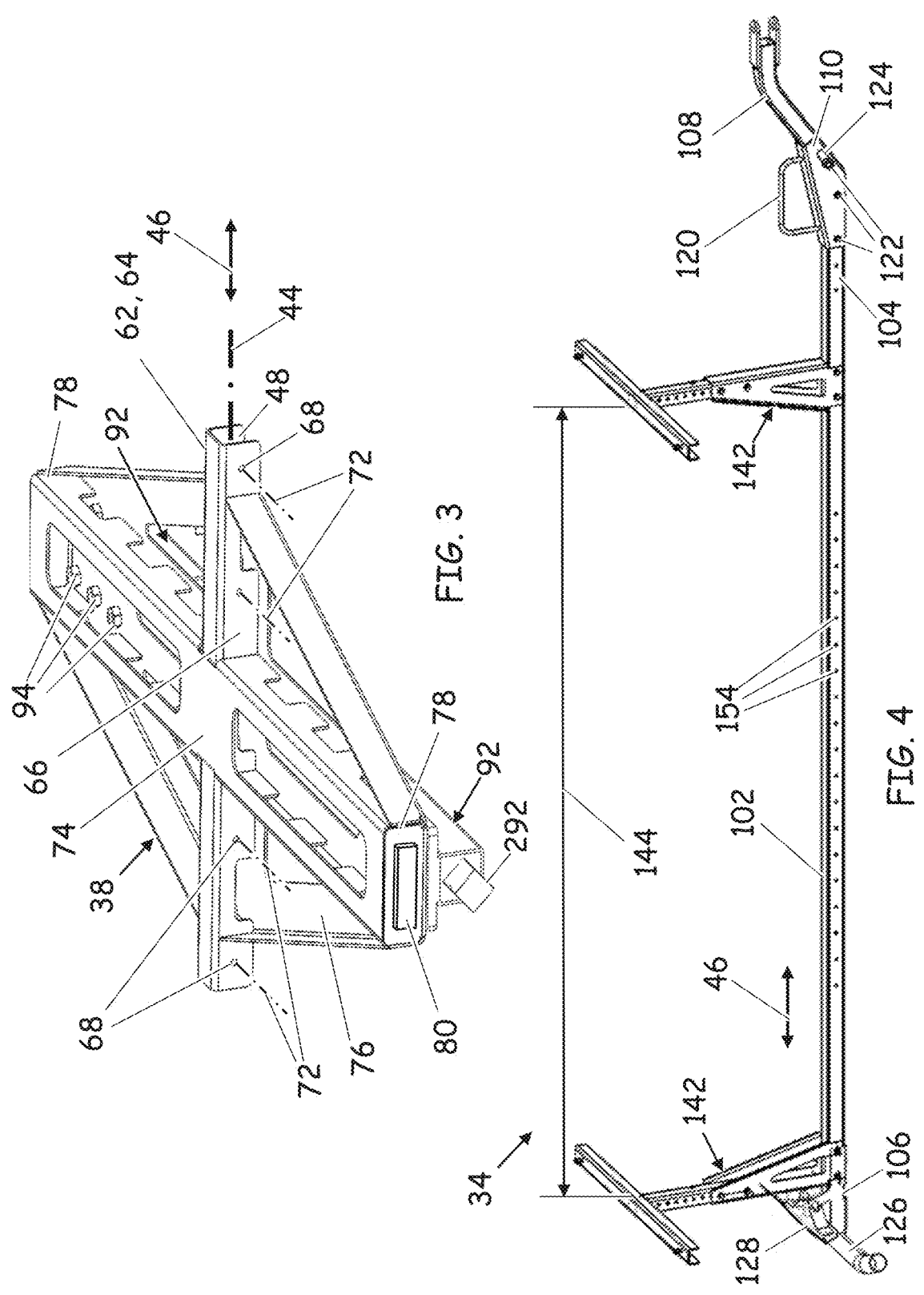
FIG. 3 is a perspective view of a chassis with axle mounts of the off-road trailer of FIG. 1 according to an embodiment of the disclosure.
FIG. 4 is a center beam assembly of the off-road trailer of FIG. 1 according to an embodiment of the disclosure.

Referring to FIG. 3, the chassis 38 is depicted in greater detail according to an embodiment of the disclosure. The chassis 38 defines a central axis 44 that extends in an axial direction 46 and about which the chassis 38 is laterally centered. In some embodiments, the chassis 38 defines a central through-passage 48 that both defines and is concentric about the central axis 44. The central through-passage 48 may be at least partially defined by a structural member 62 such as a channel 64 (depicted) or a polygonal tube. In some embodiments, a wall 66 of the structural member 62 defines a plurality of mounting holes 68, each of which may be oriented to define a lateral (depicted) or vertical mounting axis 72. In some embodiments, the plurality of mounting holes 68 of the structural member 62 are configured for alignment with a selected plurality of mounting holes defined by the center beam assembly 34, as described below. The chassis 38 may include a cross beam 74 that is laterally centered about the structural member 62 and may be supported or reinforced by a lateral gusset plate 76. In some embodiments, the lateral gusset plate 76 and the structural member 62 cooperate to define the central through-passage 48. Lateral ends 78 of the chassis 38 may be fitted with reflectors 80. In some embodiments, axle mounts 92 are coupled to the chassis 38 proximate the lateral ends 78, for example with fasteners 94.

Referring to FIG. 4, the center beam assembly 34 is depicted in greater detail according to an embodiment of the disclosure. The center beam assembly 34 includes a main beam portion 102 having a forward end 104 and a rearward end 106. Forward end 104 forms a trailer tongue portion. A hitch portion 108 may be coupled to the forward end 104, for example using a removable joint coupling 110 that bridges the main beam portion 102 and the hitch portion 108. The hitch portion 108 may be configured to accommodate any of a variety of hitch types, including pin style, flap style, pintle, and ball hitches. In some embodiments, a grip handle 120 is coupled proximate the forward end 104, for example at the removable joint coupling 110. The removable joint coupling 110 may be removable and attached to the main beam portion 102 and the hitch portion 108 with fasteners 122 (depicted). In some embodiments, the joint coupling 110 defines a slot 124 through which one or more of the fasteners 122 is coupled to secure the hitch portion 108 to the joint coupling. In some embodiments, a bumper assembly 126 is coupled to the rearward end of the main beam portion 102. The bumper assembly 126 may include active tail lights 128 that are powered with cabling (not depicted) that extends from the hitch portion 108, such as a two-pin SAE connector. The center beam assembly 34 includes upright support assemblies 142 that extend upward from the main beam portion 102, discussed in further detail attendant to FIG. 13. The upright support assemblies 142 define an axial separation distance 144 therebetween.

Herein, a "through-hole" is defined as passing through opposed sides of a member. That is, for a hollow member such as a square tube or channel, a "through-hole" may be characterized as a pair of opposed apertures that pass through opposed sides of the hollow member and are centered about the mounting axis.

Figures 5, 6, 7, 8:
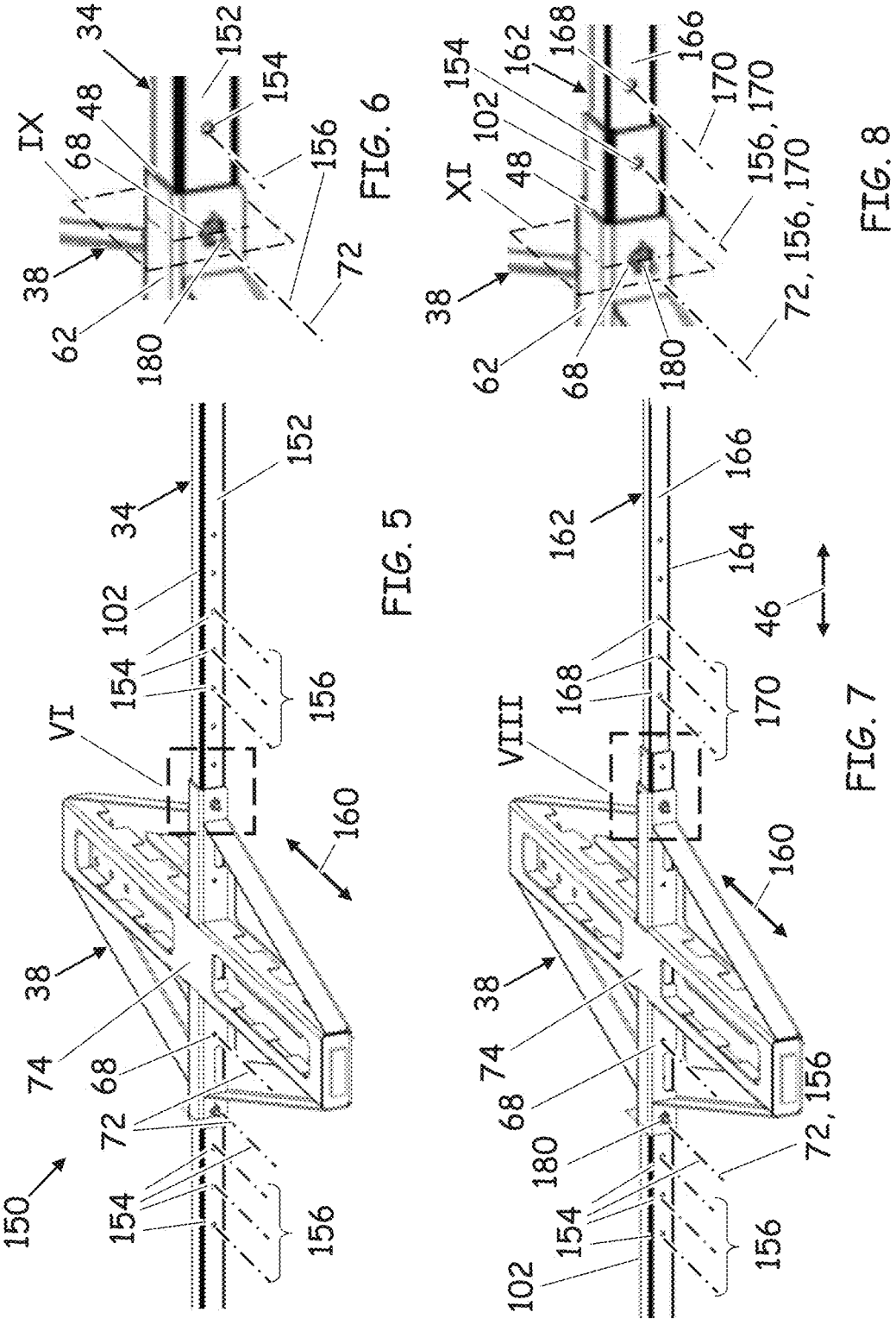
FIG. 5 is a partial perspective view of a subassembly of the chassis of FIG. 3 and the center beam assembly of FIG. 4 according to an embodiment of the disclosure.
FIG. 6 is an enlarged partial view of the subassembly of FIG. 5 at inset VI according to an embodiment of the disclosure.
FIG. 7 is a partial perspective view of a subassembly of the chassis of FIG. 3 and a telescoping center beam assembly according to an embodiment of the disclosure.
FIG. 8 is an enlarged partial view of the subassembly of FIG. 7 at inset VIII according to an embodiment of the disclosure.

Referring to FIGS. 5 and 6, a subassembly 150 of the center beam assembly 34 and the chassis 38 is depicted according to an embodiment of the disclosure. The main beam portion 102 of the center beam assembly 34 may be configured to be received by the central through-passage 48 of the chassis 38. In some embodiments, the center beam assembly 34 is configured for sliding engagement within the central through-passage 48.

In some embodiments, a wall 152 of the main beam portion 102 defines a first plurality of mounting holes 154, each of the first plurality of mounting holes 154 defining and being concentric about a respective mounting axis 156. The first plurality of mounting holes 154 may be through-holes that extend through the main beam portion 102 and may be linearly and uniformly spaced along the main beam portion 102. The respective mounting axes 156 of the first plurality of mounting holes 154 extends in the same direction as the mounting axes 72 of the plurality of mounting holes 68 of the structural member 62 (i.e., in a lateral direction 160 for FIG. 5).

Referring to FIGS. 7 and 8, a telescoping center beam assembly 162 is depicted according to an embodiment of the disclosure. The telescoping center beam assembly 162 may be implemented as an alternative to the center beam assembly 34 of FIG. 5. The telescoping center beam assembly 162 includes a telescoping beam portion 164 disposed within the main beam portion 102 in a telescoping arrangement. In some embodiments, a wall 166 the telescoping beam portion 164 defines a second plurality of mounting holes 168 that are linearly and uniformly spaced in the axial direction 46. Each of the second plurality of mounting holes 168 define and are concentric about a respective mounting axis 170 that extends in the same direction as the first plurality of mounting holes 154 of the main beam portion 102 (i.e., in the lateral direction 160 in FIG. 7). In some embodiments, the first plurality and the second plurality of mounting holes 154 and 168 are through-holes that extend through the main beam portion 102 and the telescoping beam portion 164, respectively. At least some of the first plurality of mounting holes 154 and at least some of the second plurality of mounting holes 168 are configured for selective alignment with each other.

Referring to FIGS. 9 through 12, cross-sections IX through XII of the center beam assemblies 34 and 162 coupled within the through-passage 48 of the chassis 38 for the various configurations discussed in relation to FIGS. 5 through 8 are schematically depicted according to embodiments of the disclosure. The cross-sections IX through XII represent several ways to secure the chassis 38 to the center beam assembly 34, 162. The cross-sections are representative of the various discussed configurations at planes VI and VIII of inset FIGS. 6 and 8. Cross-section IX represents the depicted embodiment of FIGS. 5 and 6, wherein the mounting holes 68 of the structural member 62 of the chassis 38 and the first plurality of mounting holes 154 of the main beam portion 102 are through-holes that are in alignment. The structural member 62 and chassis 38 are secured to the center beam assembly 34 with a fastener assembly 180 (e.g., bolt 182, nut 184, and washers 186) that passes through the aligned mounting through-holes 68 and 154. Other non-depicted fastener assemblies 180 are contemplated, including wire lock pins, tab lock pins, and bent arm pins secured with cotter pins.

Cross-section X represents an otherwise non-depicted embodiment where the main beam portion 102 may not include mounting through-holes, or at least mounting through-holes that are in alignment with the mounting through-holes 68 of the structural member 62. Rather, the mounting through-holes 68 of the structural member 62 are threaded (e.g., with tapped bushings 188 as depicted), each receiving a set screw 192 (e.g., bolt 194) that is tightened against the main beam portion 102. Also, FIG. 10 depicts the main beam portion 102 as a flanged beam portion 102a that includes flanges 196.

Cross-section XI represents the depicted embodiment of FIGS. 7 and 8, wherein the mounting holes 68, 154, and 168 of the structural member 62, the main beam portion 102, and the telescoping beam portion 164, respectively, are mounting through-holes that are in alignment and secured to the center beam assembly 162 with the fastener assembly 180. Cross-section XII represents an otherwise undepicted embodiment wherein neither the structural member 62 nor the main beam portion 102 nor the telescoping beam portion 164 define mounting through-holes as defined herein. Rather, the structural member 62 defines the mounting hole 68 only one side of the wall 66 of the structural member 62. The mounting hole 68 of the structural member 62 is threaded (e.g., with tapped the bushings 188) for receiving the set screw 192. The main beam portion 102 also does not define a mounting through-hole as defined herein but rather the mounting hole 154 or a mounting slot 198 that extends only through one side of the wall 152 of the main beam portion 102. In the depicted embodiment, the telescoping beam portion 164 does not define mounting holes, or at least is not mounting holes that are aligned with the mounting through-holes 68 of the structural member 62. Instead, the set screws 192 are tightened against the wall 166 of the telescoping beam portion 164. The force exerted on the telescoping beam portion 164 causes both the telescoping beam portion 164 and the main beam portion 102 (which are nested) to register against a portion of the wall 66 of the structural member 62 that is opposite the mounting hole of the structural member 62.

Figure 13:
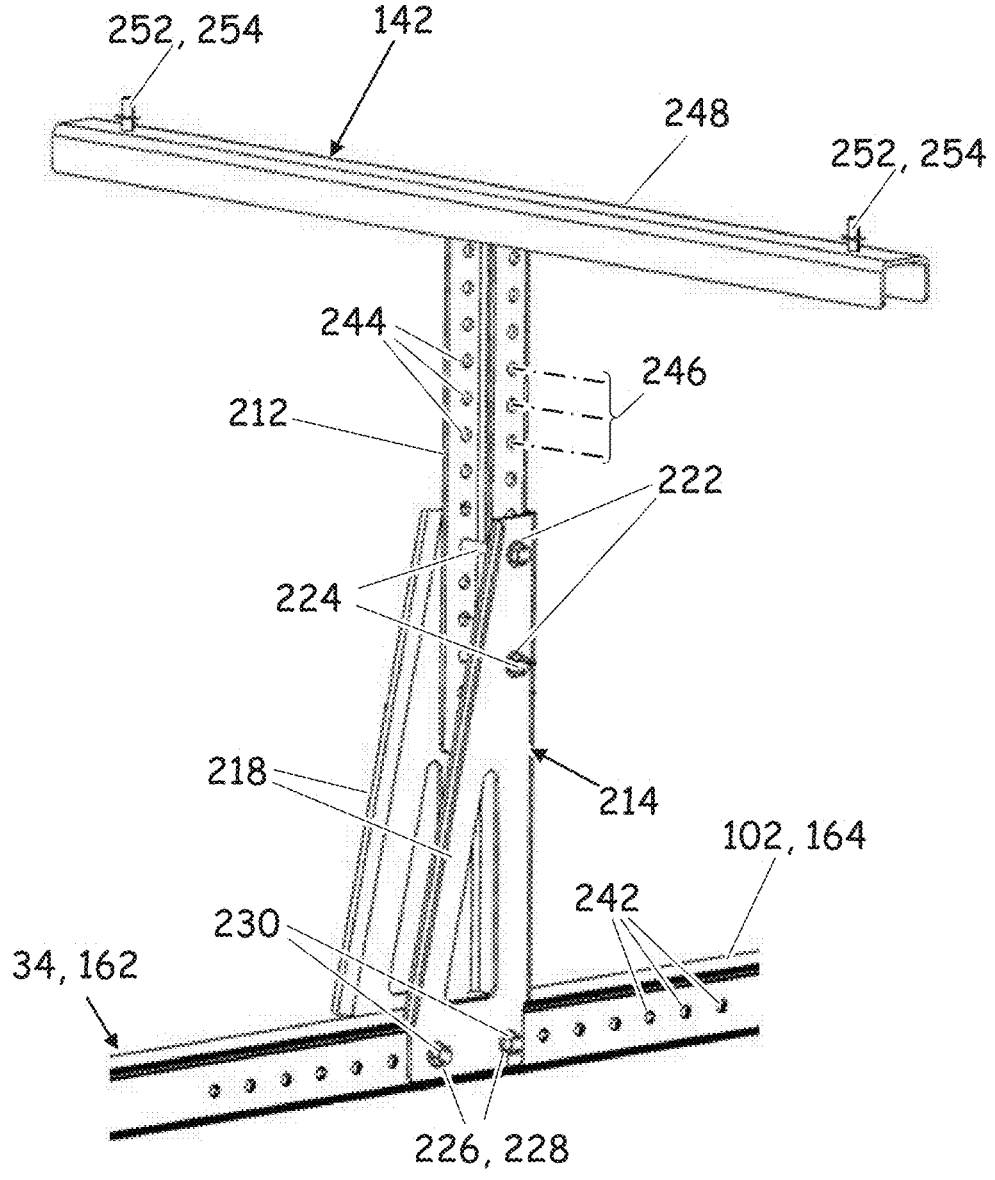
FIG. 13 is a perspective view of an upright support assembly of the center beam assembly of FIG. 4 according to an embodiment of the disclosure.

Referring to FIG. 13, the upright support assembly 142 is depicted in greater detail according to an embodiment of the disclosure. Each upright support assembly 142 includes an upright member 212 which may be supported by a gusset structure 214. In some embodiments, the gusset structure 214 includes parallel gusset plates 218 that are spaced apart to receive the upright member 212. The gusset plates 218 may define one or more upright mounting hole(s) 222 that receive fasteners 224 for coupling to the upright member 212. In some embodiments, the upright support assembly 142 is removable, with the gusset plates 218 defining a plurality of base mounting holes 226 that are configured to align with a corresponding plurality of mounting holes 228 defined by the center beam assembly 34 (or 162) to receive fasteners 230. The center beam assembly 34, 162 may define supplemental mounting holes 242 (depicted only in FIG. 13) to accommodate selective axial positioning of the upright support assembly 142 along the center beam assembly 34, 162. The supplemental mounting holes 242 may be defined by the main beam portion 102 and/or the telescoping beam portion 164.

Figure 14:
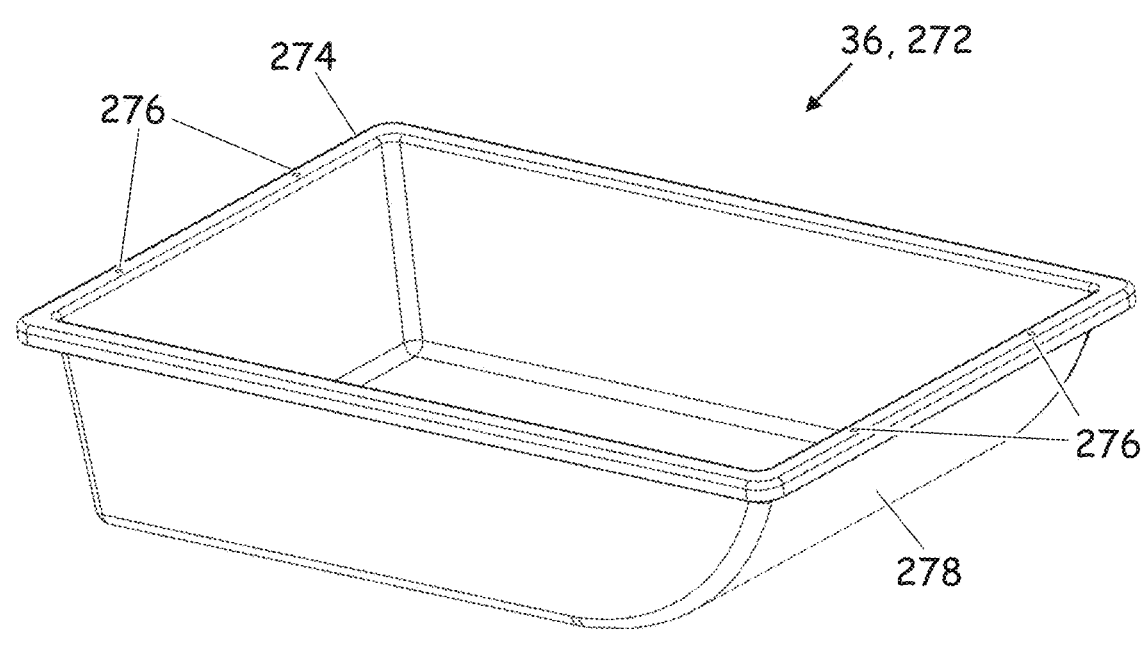
FIG. 14 is a perspective view of a trailer bed of the off-road trailer of FIG. 1 according to an embodiment of the disclosure.

In some embodiments, the upright member 212 defines a plurality of through-holes 244 configured for selective alignment with the upright mounting holes(s) 222 of the gusset structure 214. The upright member 212 may be a channel (depicted) or tube. The through-holes 244 may be arranged to define lateral (depicted) or axial mounting axes 246. In some embodiments, a lateral cross member 248 is affixed to the top of the upright member 212, and may include features 252 (e.g., threaded studs 254) that extend upward. Referring to FIG. 14, the trailer bed 36 is depicted according to an embodiment of the disclosure. The trailer bed 36 may be any of a variety of designs and constructions, including a tub 272 (depicted), box, or cage. The trailer bed 36 may be fabricated using any of a variety of materials, including polymer, metal, wood, or composites. In some embodiments, the trailer bed includes a flange portion 274. The flange portion 274 may be dimensioned to receive the lateral cross members 248 of the upright support assemblies 142, such as depicted at FIG. 1. The flange portion 274 may define mounting apertures 276 that are configured to receive the features 252 on the lateral cross member 248. In some embodiments, the trailer bed 36 may include an arcuate front wall 278. An example of the depicted trailer bed 36 is the OTTER® sled manufactured by Otter Outdoors of Maple Lake, Minnesota, U.S.A. Other storage and crate devices may be used for the trailer bed 36, including sled tubs, cargo tubs, and truck boxes.

Figure 15:
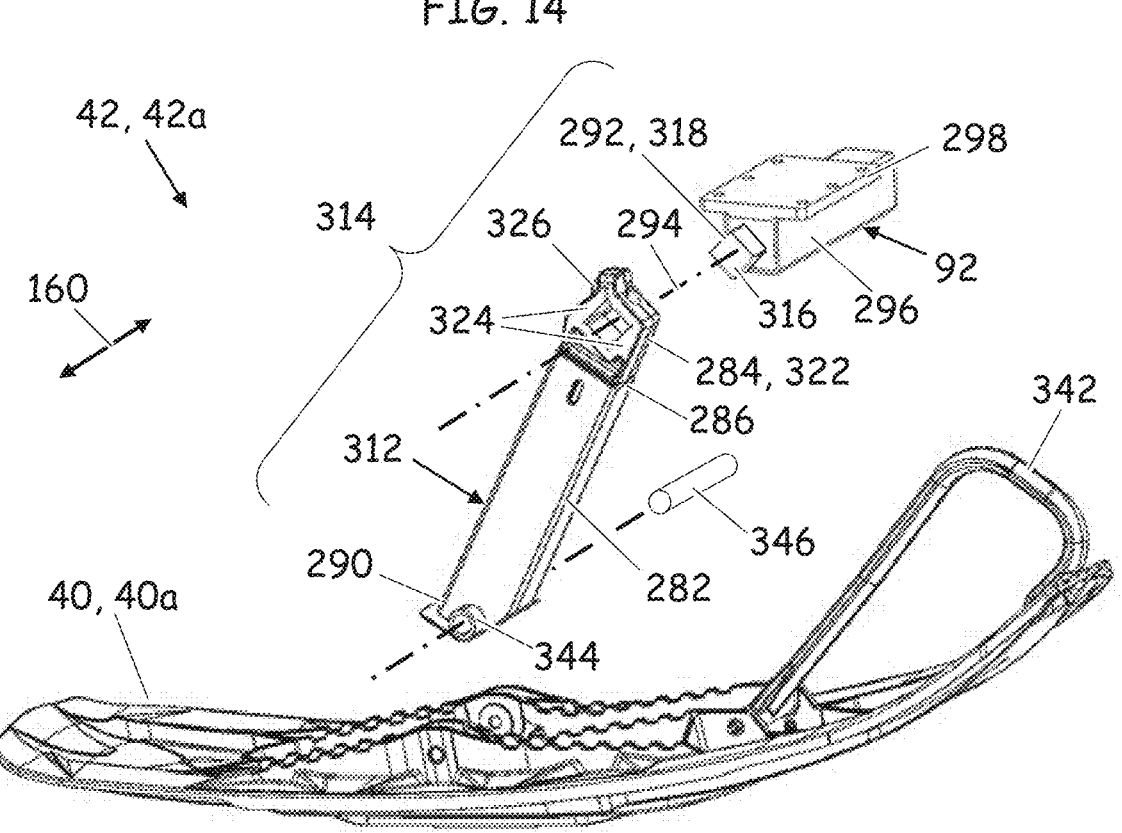
FIG. 15 is a partially exploded view of the ground engagement module and axle mount of FIG. 1 according to an embodiment of the disclosure.

Referring to FIG. 15, the ground engagement module 42 is depicted in more detail according to an embodiment of the disclosure. The ground engagement module 42 includes a strut 282 with a mechanical coupler 284 affixed to an upper end 286 and the ground engagement component 40 coupled to a lower end 290. The axle mount 92 (depicted in isolation in FIG. 15) includes a shaft 292 which defines and extends along a shaft axis 294 in the lateral direction 160, and may include a housing 296 with a mounting flange 298. In some embodiments, the strut 282 and mechanical coupler 284 combine to form a torsion arm 312 that cooperates with the axle mount 92 to effect a torsion axle assembly 314. As such, the shaft 292 may define a polygonal cross-section 316, such as a square cross-section (depicted) to act as a torsion axle 318. Other shaft cross-sections are contemplated, such as triangular, rectangular, hexagonal, and octagonal. In some embodiments, the mechanical coupler 284 includes a clamping structure 322. Jaws 324 of the clamping structure 322 may be drawn together and secured to the shaft 292 with a fastener 326. In some embodiments, the torsion axle assembly 314 provides suspension of the chassis 38 without need for an additional shock absorber or spring.

The ground engagement module 42 may be the ski module 42a, wherein the ground engagement component is the ski assembly 40a. In some embodiments, a pivot mount 344 such as a tube or bushing is affixed to the lower end 290 of the strut 282 and the ski assembly 40a pivotally mounted thereto with a pivot pin 346 (FIG. 15). The ski assembly 40a may be a standard snowmobile ski, including toe loops 342.

The ground engagement module 42 may be a wheel assembly module 42b, wherein the ground engagement component 40 is the wheel or tire 40b. The wheel or tire 40b may be coupled to the lower end 290 of the strut with a spindle or shaft 352 configured to mount within the pivot mount 344 (FIG. 2).

Functionally, the sliding engagement between the center beam assembly 34 and the chassis 38 enables the suspension assembly 32 to be positioned at arbitrary axial locations along the center beam assembly 34, thereby enabling the ground engagement components 40 to be properly centered for trailer beds 36 of a range of different sizes for better balance and weight support. The chassis 38 provides structural support and lateral stability for the trailer bed 36. The various fastening arrangements of FIGS. 9 through 12 enable the chassis 38 to be secured at the selected axial location. For the through-hole mounting arrangements of cross-sections IX and XI, the axial positioning can be resolved according to the spacing of the first and/or second pluralities of mounting holes 154 and 168. For the mounting arrangements of the set screw 192 of the cross-sections X and XII, the axial positioning effectively has infinite resolution. The flanges 196 of the flanged main beam 102a may act to capture the set screws 192 in the vertical direction should the set screw 192 slip on or become disengaged from the wall 152 of the main beam portion 102.

Figures 15A, 15B:
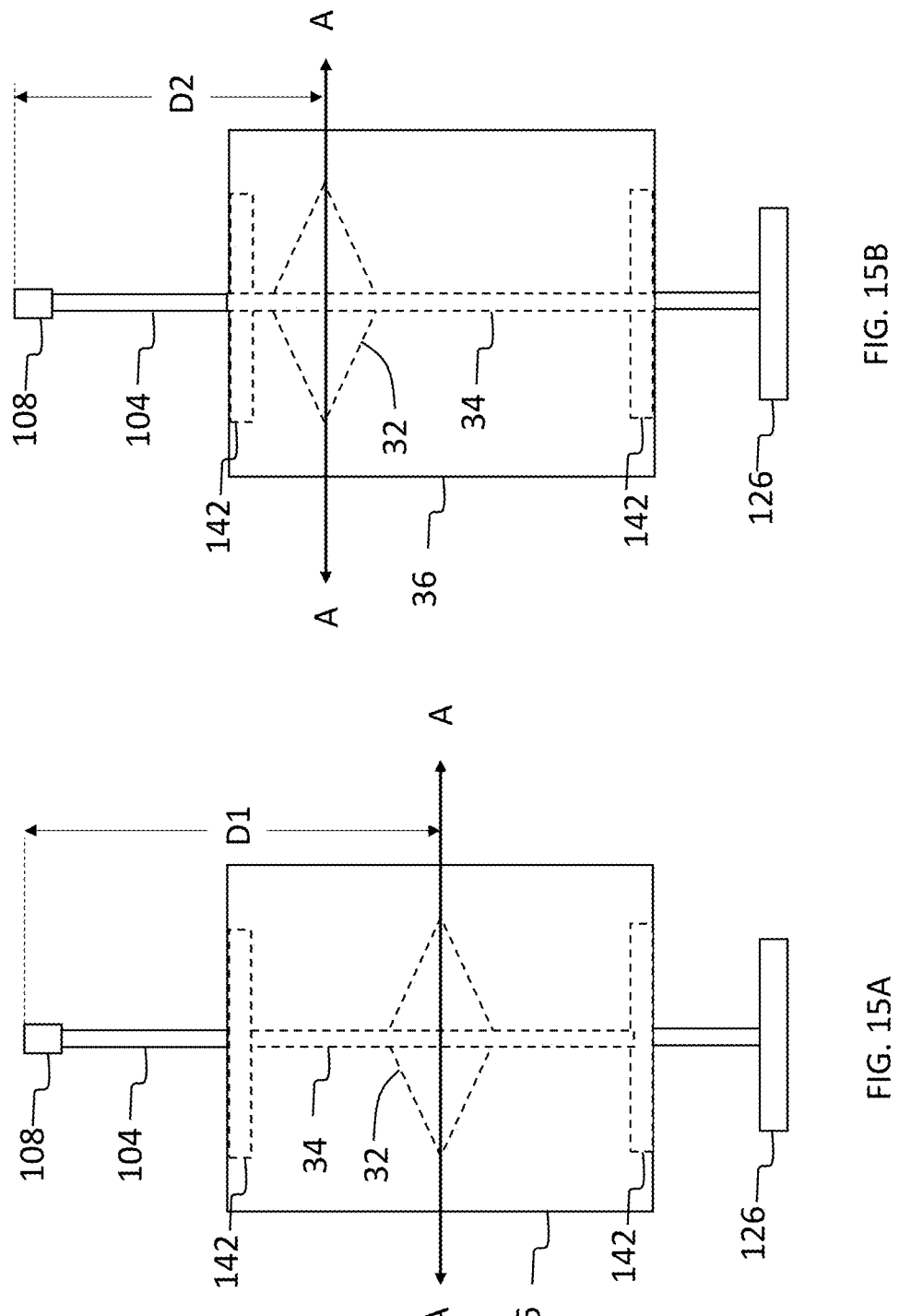
FIG. 15A is a schematic view of a trailer center beam assembly with a suspension assembly located at a first beam location according to an embodiment of the disclosure.
FIG. 15B is a schematic view of a trailer center beam assembly with a suspension assembly located at a second beam location according to an embodiment of the disclosure.

Referring to FIGS. 15A and 15B, schematic views of trailer are depicted. In FIG. 15A, suspension assembly 32 is located at a first beam location, while in FIG. 15B, suspension assembly 32 is located at a second beam location, which is closer to forward end 104 and hitch assembly 108. More specifically, in FIG. 15A, a center of suspension assembly 32, and lateral axis A, which is also a pivot axis A for the trailer, is located a distance D1 from hitch portion 108, while in FIG. 15B, the center of suspension assembly 32, and pivot axis A, is located a distance D2 from hitch portion 108. Distance D2 is shorter than distance D1. The position of trailer bed 36 on trailer center beam assembly 34 is the same in both configurations depicted.

As described above, trailer bed 36 for receiving a trailer payload is secured to upright support assemblies 142, and ground engagement modules 42 that contact the terrain and support the weight of the off-road trailer are connected to the suspension assembly 32 via chassis 38. Beam assembly 34 and suspension assembly 138 function as a lever beam and lever fulcrum, respectively, such that the off-road trailer pivots about axis A. Moving suspension assembly 38 forward or rearward along, i.e., decreasing or increasing a distance D from hitch assembly 108, moves pivot axis A axially along beam assembly 34, and shifts the amount of weight of trailer bed 36 and its payload relative to pivot axis A. This causes a tongue weight at hitch assembly to respectively increase or decrease for a given payload. The tongue weight is the weight of the trailer and payload as applied to hitch assembly 108, as will be understood by those of ordinary skill in the art. Consequently, in FIG. 15B, trailer bed 36 and its payload have been shifted rearward of the pivot axis A (and fulcrum of the lever), such that for a same payload, the tongue weight at hitch assembly 108 will be less than a tongue weight at hitch assembly 108 for the configuration of FIG. 15A.

Consequently, the ability to attach suspension assembly 38 at multiple axial locations on trailer center beam assembly 34 allows a user to adjust trailer tongue weight as needed, depending upon various factors, such as vehicle tongue-weight limits, trailer bed 36 dimensions, and in particular, payload characteristics such as payload weight and size, providing advantages over known off-road trailers.

The disclosed embodiments of the off-road trailer 30 provide several ways for selecting the axial separation distance 144 between the upright support assemblies 142, thereby providing functionality for accommodating trailer beds 36 of different lengths and heights. For example, the axial location of one or both of the upright support assemblies 142 may be adjusted by aligning the base mounting holes 226 with selected supplemental mounting holes 242 of the center beam assembly 34 and securing with the fasteners 230 thereto. While the through-hole arrangements akin to FIG. 9 are depicted at FIG. 13, the artisan will recognize, in light of this disclosure, that the axial positioning function may be effected by application mutatis mutandis of the mounting arrangement depicted at FIG. 10, for example by telescoping the forward upright support assembly 142 further from or closer to the rearward upright assembly 142 to set the axial separation distance 144. Such an adaptation may include the flanged main beam 102a depicted at FIG. 10. In an alternative embodiment, the center beam assembly 34 doesn't include the supplemental mounting holes 242 for mounting the upright support assembly 142; rather, the gusset structure 214 may be selectively positioned along the center beam assembly 34 and the base mounting holes 226 used as a template to form custom mounting holes in the center beam assembly 34, for example with a drill bit. The overall height of the upright support assembly 142 may be adjusted to accommodate trailer beds 36 of different heights by aligning selected corresponding holes of the plurality of holes 244 of the upright member 212 with the one or more upright mounting hole(s) 222 and securing with the fastener(s) 224. In another example, the telescoping center beam assembly 162 enables selection of a first of the upright support assemblies 142 that is mounted to the main beam portion 102 to be selectively spaced from a second of the upright support assemblies 142 that is mounted to the telescoping beam portion 164 without dismounting either of the upright support assemblies 142.

Figure 15D:
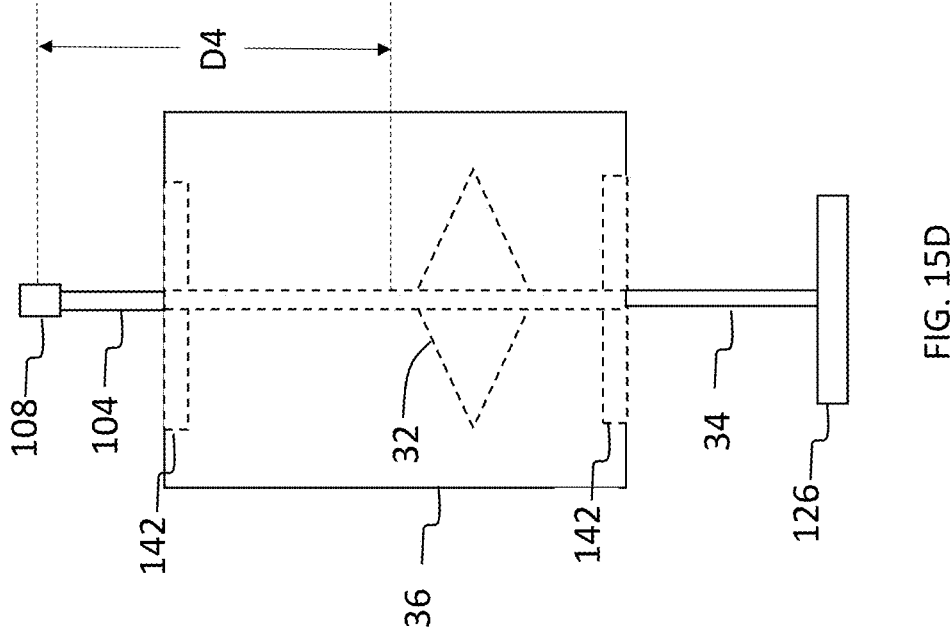
FIG. 15D is a schematic view of a trailer center beam assembly with support assemblies located at second beam locations according to an embodiment of the disclosure.
Figure 15C:
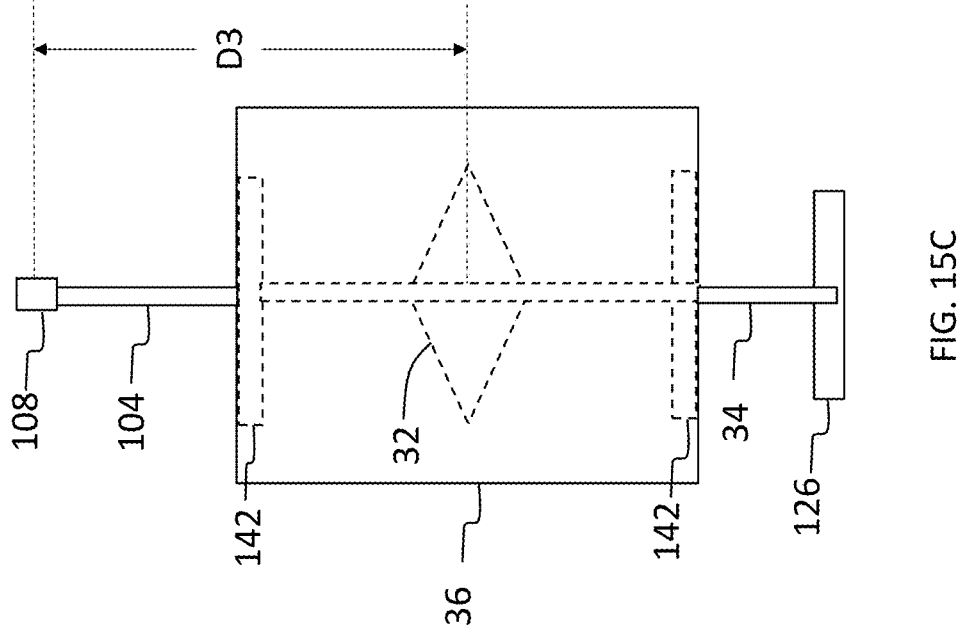
FIG. 15C is a schematic view of a trailer center beam assembly with support assemblies located at first beam locations according to an embodiment of the disclosure.

Referring to FIGS. 15C and 15D, schematic views of trailer center beam assembly 34 with support assemblies 142 located at first beam location, and a second beam location are respectively depicted. As explained below, shifting support assemblies 142 forward or rearward shifts a position of trailer bed 36 and its payload forward or rearward, thereby affecting tongue weight at hitch assembly 108.

Referring specifically to FIG. 15C, the pair of support assemblies 142 attached to trailer bed 36 are located at a first beam position along beam assembly 34, such that a center of trailer bed 36 is located a distance D3 from hitch assembly 108.

Referring also to FIG. 15D, the pair of support assemblies 142 attached to trailer bed 36 are shifted forward, toward forward end and tongue 104, as compared to that of FIG. 15C, such that the support assemblies are located at a second beam position along beam assembly 34. As such, a center of trailer bed 36 is located a distance D4 from hitch assembly 108. Distance D4 is less than distance D3, such that trailer bed 36 and its payload is shifted closer to hitch assembly 108 as compared to the configuration of FIG. 15C. Consequently, a tongue weight at hitch assembly 108 for the configuration of FIG. 15D will be generally greater than a tongue weight at hitch assembly 108 for the configuration of FIG. 15C.

Being able to shift the position of trailer bed 36 on trailer center beam assembly 34 allows a user to adjust trailer tongue weight as needed, depending upon various factors, such as vehicle tongue-weight limits, trailer bed 36 dimensions, and in particular, payload characteristics such as payload weight and size, providing advantages over known off-road trailers. In one embodiment, support assemblies 142 and trailer bed 36 are axially adjustable as described with respect to FIGS. 15C and 15D, and suspension assembly 32 may also be axially adjustable as described with respect to FIGS. 15A and 15B, such that a user may fine-tune tongue weight to accommodate many different factors.

The removable joint coupling 110 provides for the use of and ready conversion to a variety of hitch types. The slot 124 of the joint coupling 110 enables a height the hitch portion 108 to be adjusted. The grip handle 120 facilitates manual maneuvering and handling of the off-road trailer 30. The active tail lights 128 provide rearward illumination, braking, and/or turn signaling functionality.

The features on the lateral cross member 248 extend through the mounting apertures 276 of the trailer bed 36 for securing the trailer bed 36 to the off-road trailer 30, for example with nuts or wing nuts. Trailer beds 36 with arcuate front walls 278 provides both aerodynamic and a sliding utility. That is, the arcuate front wall 278 may reduce aerodynamic drag of the off-road trailer 30 at high speeds relative to a squared front wall, and is also easier to slide along a snow pack when transporting the trailer bed 36 and attendant payload to the off-road trailer 30. Utilizing standard, off-the-shelf tubs of polymer construction provides a light and durable trailer bed that is readily replaceable.

A Cartesian coordinate system 354 having x, y, and z coordinates of arbitrary origin is depicted in FIG. 1 that serves as the basis for directional and positional nomenclature herein. "Axial" refers to a direction parallel to the z-coordinate, with "forward" being in the positive direction and "rearward" being in the negative direction. "Lateral" is a direction that is orthogonal to the x-coordinate and parallel to the x-y plane. "Vertical" is a direction that is orthogonal to the x-coordinate and parallel to the x-z plane. "Upper" and "lower" refer to directions that are parallel to the z-coordinate in the positive and negative directions, respectively.

Referring to FIGS. 16 through 23, shipping and storage configurations 370a, 370b, and 370c of the off-road trailer 30 are explained and depicted according to an embodiment of the disclosure. The components of the off-road trailer 30 are depicted as they would appear in combination or isolation in a shipping or storage context and are referred to as "packaged" components. Interior boundaries 372 defining a rectangular box are depicted in phantom, representing minimum interior dimensions of a crate (not depicted) for the packaged components as arranged. The packaged components are identified by the same reference characters as in the preceding drawings followed by a prime (') suffix (e.g., "packaged ground engagement component 40'''"). Also, the dimensions and/or orientations of the packaged components are referenced to a Cartesian coordinate system having x', y', and z' coordinates and are also identified in discussion with prime (') suffixes.

In some embodiments, the packaged components are restricted to a maximum allowable height Hmax', where "height" is a dimension of a given packaged component parallel to the z'-coordinate. In general terms, the maximum allowable height Hmax' may be based on the packaged component that has a greatest minimum overall dimension Dmin'. For the depicted embodiments, greatest minimum overall dimensions Dmin' are defined by the ground engagement components 40' (e.g., the ski assembly 40a of the ski module 42a or the wheel/tire 40b of the wheel assembly module 42b).

Figures 16, 17:
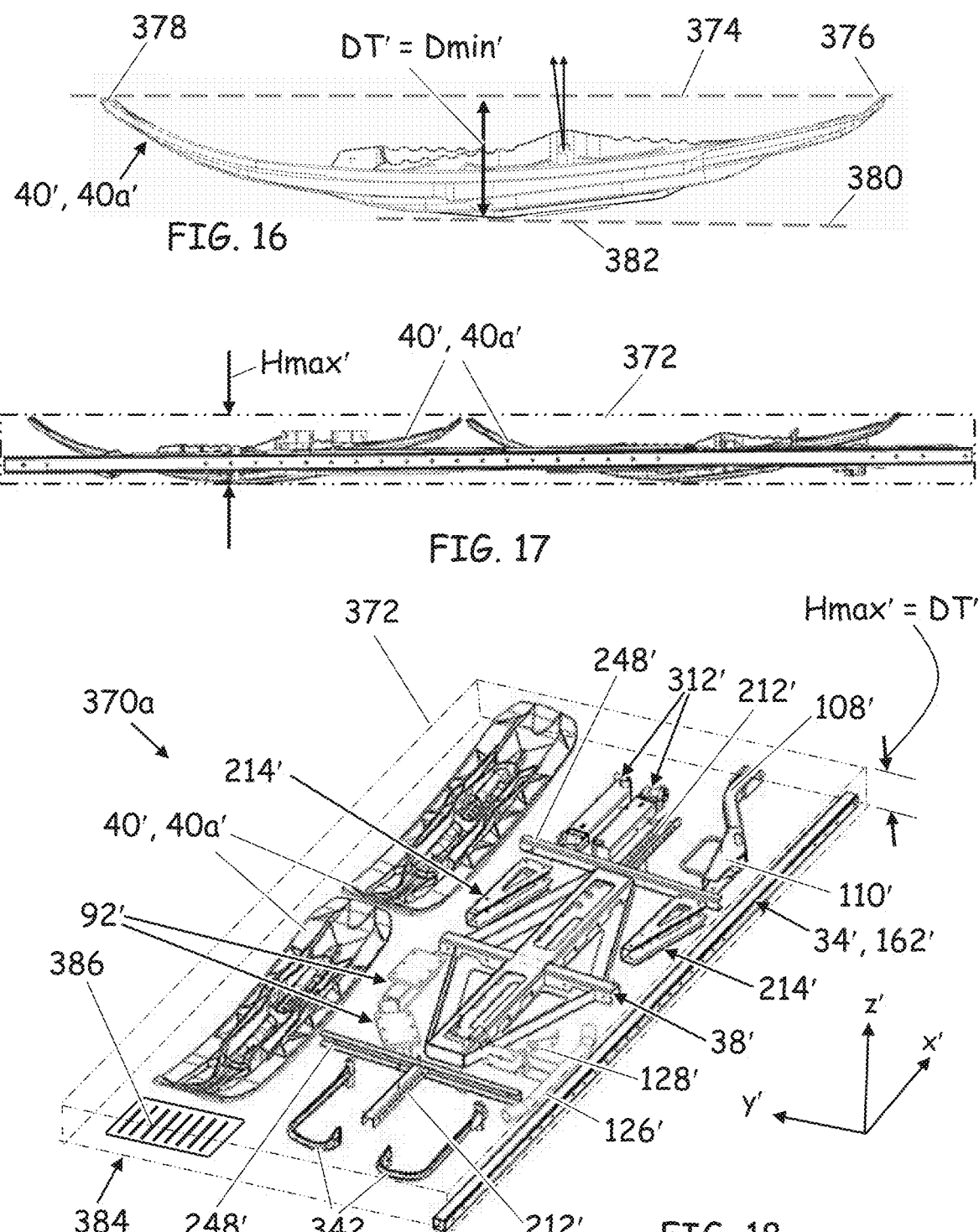
FIG. 16 is a side elevational view of a partial ski assembly of FIG. 18 with toe loops removed and in a packaging orientation according to an embodiment of the disclosure.
FIG. 17 is a side elevational view of the off-road trailer of FIG. 1 in a packaging configuration according to an embodiment of the disclosure.
Figure 20:
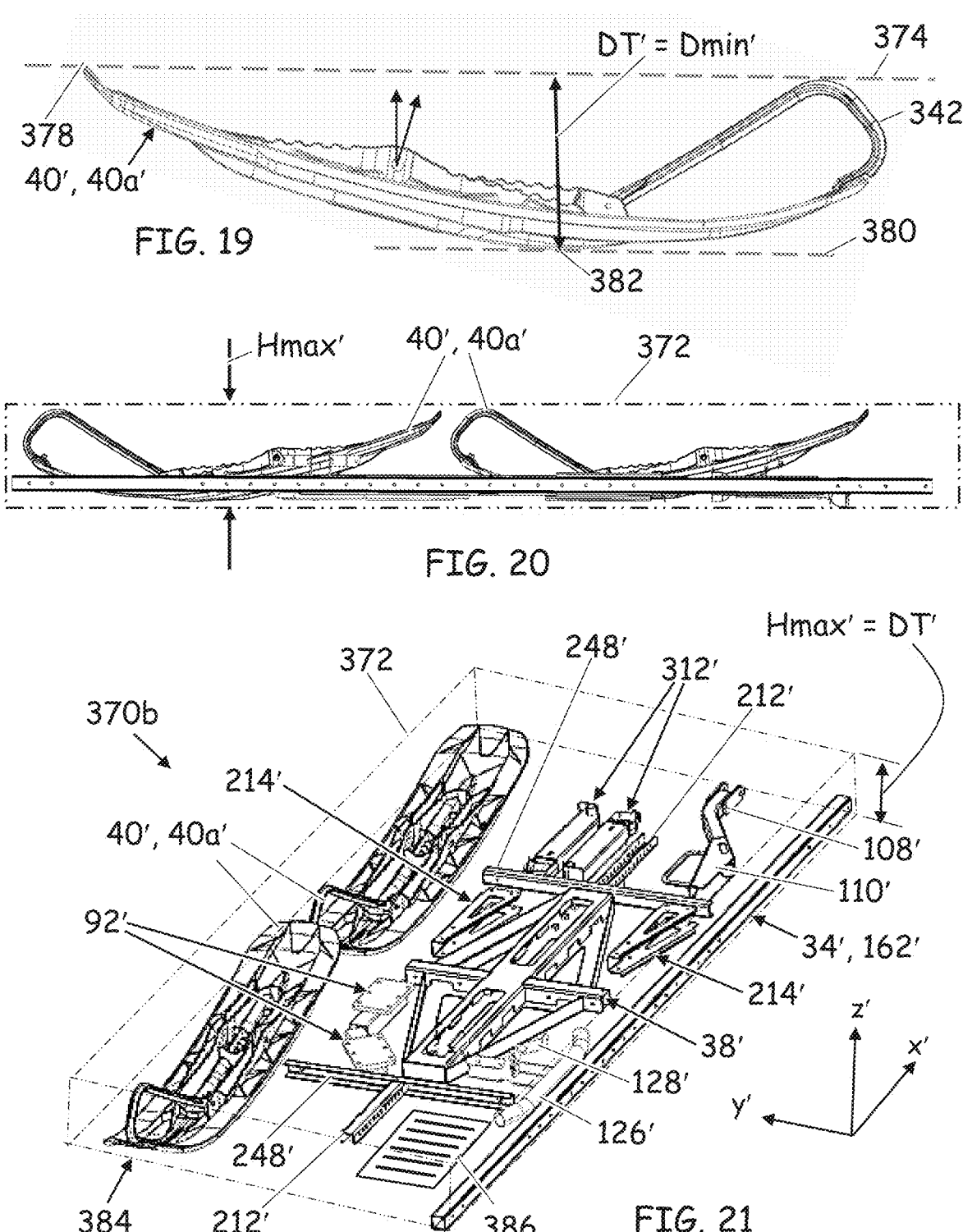
FIG. 20 is a side elevational view of the off-road trailer of FIG. 1 in an alternative packaging configuration according to an embodiment of the disclosure.
Figure 22:
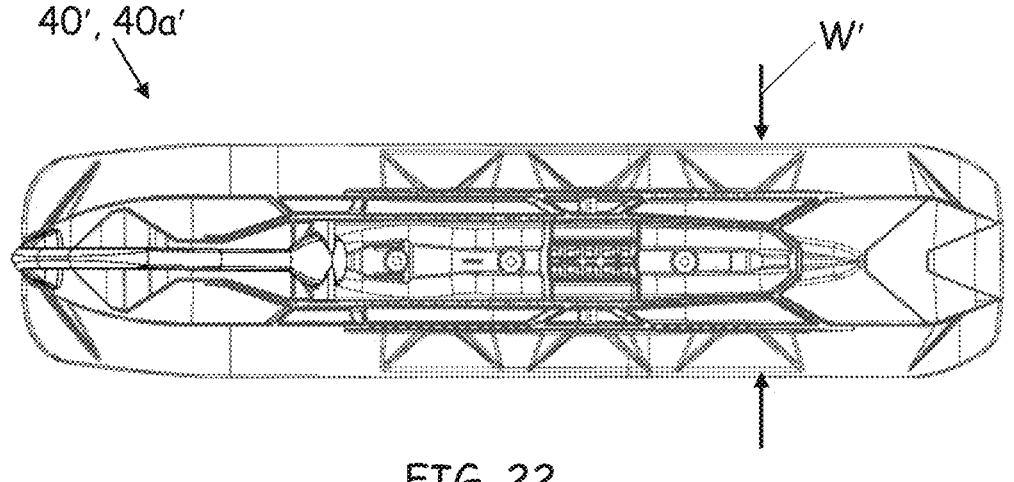
FIG. 22 is a plan view of the ski assembly of FIG. 19 according to an embodiment of the disclosure.

For example, for the depicted off-road trailer 30 equipped with ski modules 42a (FIG. 1), the toe loops 342 may be removed and the minimum overall dimension Dmin' may be a tangential dimension DT', defined as being between a first datum 374 that is tangential to a forward extremity 376 and a rearward extremity 378 of the packaged ski assembly 40a', and a second datum 380 that is parallel to the first datum 374 and is tangential to a bottom 382 of the packaged ski assembly 40a' (configuration 370a of FIGS. 16 through 18). In another example, the packaged toe loops 342' remain with the packaged ski assembly 40a' and the first datum 374 is tangential to the packaged toe loop 342' and the rearward extremity 378 of the packaged ski assembly 40a', the second datum 380 again being parallel to the first datum 374 and tangential to the bottom 382 of the packaged ski assembly 40a' (configuration 370b of FIGS. 19 through 21).

In some embodiments, the maximum allowable height Hmax' is based on an overall dimension that is not a greatest minimum overall dimension. That is, for various reasons, it may be determined that a different component dimension should govern the maximum allowable height Hmax'. In one example (configuration 370c of FIGS. 22 and 23), a width W' of the packaged ski assembly 40a' may be of greater dimension than the tangential dimension DT' and thus is not a "minimum" overall dimension. Due to other considerations (e.g., reduction of the overall volume of the crate), the width W' may be chosen as the basis for the maximum allowable height Hmax'.

Accordingly, for the depicted off-road trailer 30 with ski modules 42a (FIG. 1), the maximum allowable height of the packaged components may be arranged and/or disassembled to fit within a maximum allowable height Hmax' that is referenced to the tangential dimension DT' or the width W' of packaged ski assembly 40a'. Similarly, a (non-depicted) shipping and storage configuration for the off-road trailer 30 with wheel assembly modules 42b could be based on, for example, a lateral width of the wheel or tire 40b of the wheel assembly module 42b.

Figure 23:
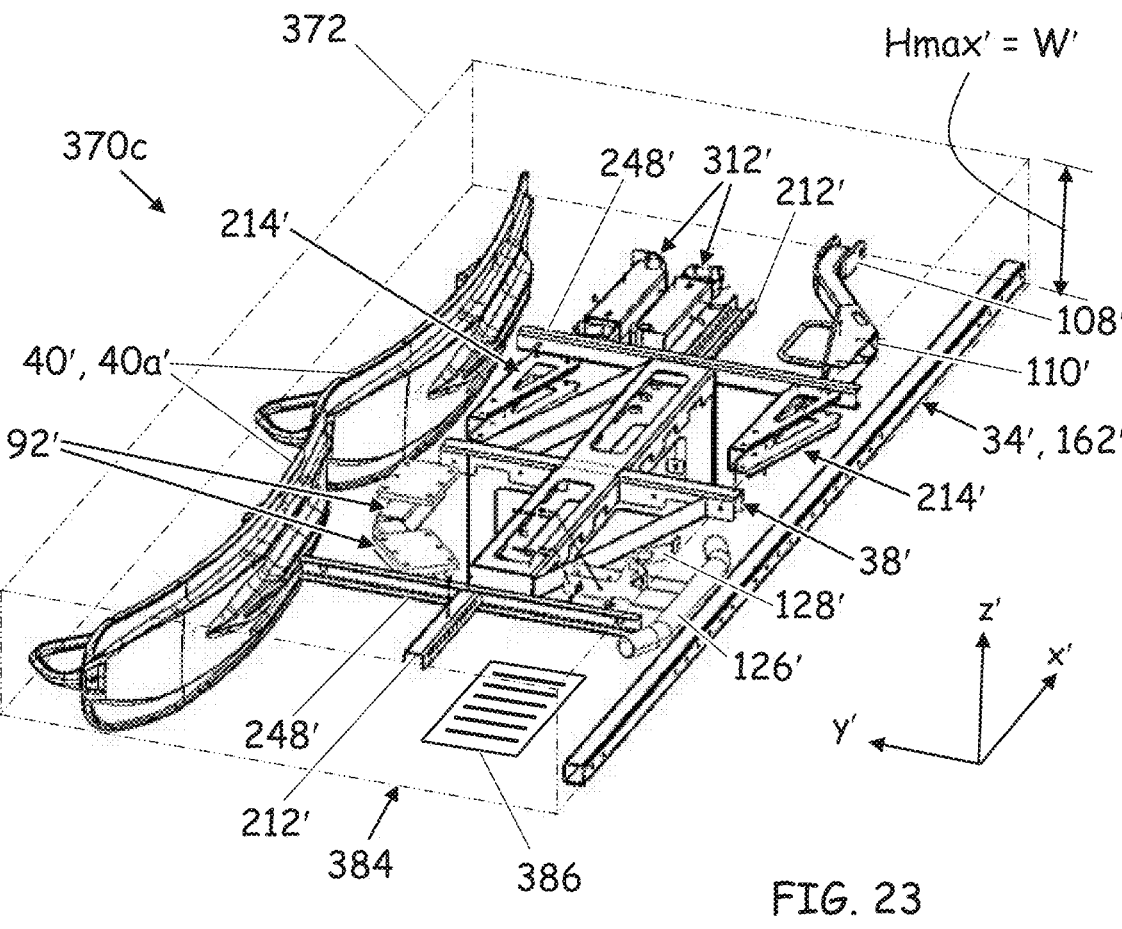
FIG. 23 is a perspective view of an alternative packaging configuration of the off-road trailer of FIG. 1 according to an embodiment of the disclosure.

In some embodiments, some or all of the components of the disclosed off-road trailers 30 are provided as a kit 384, such as depicted for the crating arrangements at FIGS. 18, 21, and 23, complete with instructions 386 for assembly and use. The instructions may include how to locate and secure the chassis 38 to the center beam and how to adjust the axial position of the uprights to accommodate different trailer bed lengths. Such instructions 386 may embody the techniques and methods depicted or described herein.

The instructions 386 are provided on a tangible, non-transitory medium, and may be physically included with the kit 384 such as on a printed document (depicted), compact disc, or flash drive. Non-limiting examples of a tangible, non-transitory medium include a paper document and computer-readable media including compact disc and magnetic storage devices (e.g., hard disk, flash drive, cartridge, floppy drive). The computer-readable media may be local or accessible over the internet. The instructions 386 may be complete on a single medium, or divided among two or more media. For example, some of the instructions 386 may be written on a paper document that instruct the user to access one or more of the steps of the method over the internet, the internet-accessible steps being stored on a computer-readable medium or media. The instructions 386 may embody the techniques and methods depicted or described herein using text, photos, videos, or a combination thereof to instruct and guide the user. The instructions may be in the form of written words, figures, photos, video presentations, or a combination thereof to instruct and guide the user.

The following clauses illustrate the subject matter described herein.

Clause 1. An off-road towable trailer, including: an axially-extending beam assembly having a first end and a second end, the first end forming a tongue portion; a chassis configured to be selectively positioned and affixed to the axially-extending beam assembly at a first axial position and at a second axial position; a ground engagement component coupled to, and supporting, the chassis. The chassis is positioned and affixed at the first axial position is closer to the tongue portion as compared to the chassis positioned and affixed at the second axial position, such that a tongue weight of the off-road towable trailer with the chassis positioned and affixed at the first axial position is different than a tongue weight of the trailer with the chassis positioned and affixed at the second axial position.

Clause 2. The towable trailer of clause 1, wherein the center beam assembly includes a main beam portion.

Clause 3. The towable trailer of clause 2, wherein a wall of the main beam portion defines a first plurality of mounting holes, each of the first plurality of mounting holes defining and being concentric about a respective mounting axis.

Clause 4. The towable trailer of clause 3, wherein the first plurality of mounting holes are through-holes that extend through the main beam portion.

Clause 5. The towable trailer of clause 3, wherein the respective mounting axis extends in the lateral direction.

Clause 6. The towable trailer of clause 3, wherein the first plurality of mounting holes are linearly and uniformly spaced along the main beam portion.

Clause 7. The towable trailer of clause 2, wherein the center beam assembly includes a telescoping beam portion disposed within the main beam portion in a telescoping arrangement.

Clause 8. The towable trailer of clause 7, wherein a wall of the telescoping beam portion defines a second plurality of mounting holes, each of the second plurality of mounting holes defining and being concentric about a respective mounting axis.

Clause 9. The towable trailer of clause 8, wherein at least some of the first plurality of mounting holes and at least some of the second plurality of mounting holes are configured for selective alignment with each other.

Clause 10. The towable trailer of clause 1, comprising a torsion axle assembly coupled to the chassis, the ground engagement component being coupled to a torsion axle of the torsion axle assembly.

Clause 11. The towable trailer of clause 10, wherein the torsion axle defines a polygonal cross-section.

Clause 12. The towable trailer of clause 11, wherein the polygonal cross-section defines a square.

Clause 13. A method of shipping an off-road towable trailer, including: determining a maximum allowable height of packaged components to be crated based on an overall dimension of a component having a greatest minimum overall dimension; configuring each of the packaged components to have a height that is less than or equal to the maximum allowable height; and arranging the packaged components in a crate for shipping.

Clause 14. The method of clause 13, wherein the maximum allowable height is the greatest minimum overall dimension.

Clause 15. The method of clause 13, wherein the component having the greatest minimum overall dimension is a ground engagement component.

Clause 16. The method of clause 13, wherein the ground engagement component is a tire.

Clause 17. The method of clause 16, wherein the maximum allowable height is based on a lateral width of the tire.

Clause 18. The method of clause 13, wherein the ground engagement component is a ski assembly.

Clause 19. A method for adjusting an off-road trailer to receive trailer beds of different lengths, including: providing an off-road trailer including a chassis that defines a central through-passage about a central axis that extends in an axial direction, the chassis being laterally centered about the central axis, and a center beam assembly configured to be received by the central through-passage, the center beam assembly including a first upright assembly and a second upright assembly, wherein the chassis, the first upright assembly, and the second upright assembly are arranged for supporting a trailer bed; and providing instructions on a tangible, non-transitory medium, the instructions including steps for securing the chassis to the center beam assembly.

Clause 20. The off-road trailer of clause 19, wherein the center beam assembly provided in the step of providing the off-road trailer includes a first upright assembly and a second upright assembly; and the instructions include steps for adjusting the off-road trailer to receive trailer beds of different lengths.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize, in view of this disclosure, that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no patent claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. An off-road towable trailer, comprising:

an axially-extending beam assembly having a first end and a second end, the first end forming a tongue portion;

a suspension assembly configured to be selectively positioned and affixed to the axially-extending beam assembly at a first axial position and at a second axial position;

a ground engagement component coupled to, and supporting, the suspension assembly;

wherein the suspension assembly positioned and affixed at the first axial position is closer to the tongue portion as compared to the suspension assembly positioned and affixed at the second axial position, such that a tongue weight of the off-road towable trailer with the suspension assembly positioned and affixed at the first axial position is different than a tongue weight of the trailer with the suspension assembly positioned and affixed at the second axial position.

2. The towable trailer of claim 1, wherein a center beam assembly includes a main beam portion.

3. The towable trailer of claim 2, wherein a wall of said main beam portion defines a first plurality of mounting holes, each of said first plurality of mounting holes defining and being concentric about a respective mounting axis.

4. The towable trailer of claim 3, wherein said first plurality of mounting holes are through-holes that extend through said main beam portion.

5. The towable trailer of claim 3, wherein said respective mounting axis extends in said lateral direction.

6. The towable trailer of claim 3, wherein said first plurality of mounting holes are linearly and uniformly spaced along said main beam portion.

7. The towable trailer of claim 2, wherein said center beam assembly includes a telescoping beam portion disposed within said main beam portion in a telescoping arrangement.

8. The towable trailer of claim 7, wherein a wall of said telescoping beam portion defines a second plurality of mounting holes, each of said second plurality of mounting holes defining and being concentric about a respective mounting axis.

9. The towable trailer of claim 8, wherein at least some of a first plurality of mounting holes and at least some of said second plurality of mounting holes are configured for selective alignment with each other.

10. The towable trailer of claim 1, comprising a torsion axle assembly coupled to a chassis, said ground engagement component being coupled to a torsion axle of said torsion axle assembly.

11. The towable trailer of claim 10, wherein said torsion axle defines a polygonal cross-section.

12. The towable trailer of claim 11, wherein said polygonal cross-section defines a square.

* * * * *